(12) United States Patent
Hueber et al.

(10) Patent No.: US 9,887,832 B1
(45) Date of Patent: Feb. 6, 2018

(54) METHOD AND SYSTEM TO CALIBRATE PHASE SUPPORTED BY FACTORY TRIM DATA

(71) Applicant: NXP B.V., Eindhoven (NL)

(72) Inventors: Gernot Hueber, Linz (AT); Ian Thomas Macnamara, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/225,782

(22) Filed: Aug. 1, 2016

(51) Int. Cl.
| | |
|---|---|
| *H03H 7/40* | (2006.01) |
| *H04L 7/04* | (2006.01) |
| *H04W 4/00* | (2009.01) |
| *H04B 17/318* | (2015.01) |
| *H04L 12/741* | (2013.01) |

(52) U.S. Cl.
CPC ............ *H04L 7/04* (2013.01); *H04B 17/318* (2015.01); *H04L 45/745* (2013.01); *H04W 4/008* (2013.01)

(58) Field of Classification Search
CPC ......... H04L 25/03057; H04L 25/03038; H04L 27/2657; H04B 1/7085; H04B 1/16; H04W 4/02
USPC ...... 375/229, 322, 324, 319, 346; 455/456.6
See application file for complete search history.

(56) References Cited

U.S. PATENT DOCUMENTS

| | | | |
|---|---|---|---|
| 2010/0328073 A1* | 12/2010 | Nikitin .................. | G01S 5/0247 340/572.1 |
| 2013/0029608 A1 | 1/2013 | Kuo et al. | |
| 2014/0038662 A1 | 2/2014 | Alberth, Jr. et al. | |
| 2015/0358771 A1* | 12/2015 | Richley .................. | H04W 4/02 455/456.1 |
| 2016/0054731 A1* | 2/2016 | Hoffman .............. | G05B 19/418 700/121 |

FOREIGN PATENT DOCUMENTS

EP    2 988 427 A1    2/2016

OTHER PUBLICATIONS

Extended European Search Report for Patent Appl. No. 17183142.3 (dated Dec. 14, 2017).

* cited by examiner

*Primary Examiner* — Khai Tran (57) ABSTRACT

The present invention provides for a method and system to compensate phase offset caused by the IC (integrated circuit) by making use of factory measurement stored as trim-data in the IC. In the final customer product, the trim-data is mapped to the actual platform environment such that the respective phase offset can be compensated.

17 Claims, 6 Drawing Sheets

METHOD AND SYSTEM TO CALIBRATE PHASE SUPPORTED BY FACTORY TRIM DATA

FIELD

The described embodiments relate generally to method and system to calibrate phase in a near field communication (NFC) system, and more particularly to method and system to calibrate phase supported by factory trim data in a near field communication (NFC) system.

BACKGROUND

The use of Near Field Communication (NFC) is becoming common place in applications such as contactless payment systems, security access systems, etc. A typical NFC based system consists of a NFC reader Point of Sale terminal) and a NFC device, typically a NFC enabled card or a mobile phone.

Furthermore, a NFC device typically can be configured for either passive load modulation (PLM) or active load modulation (ALM). While, ALM is typically more complex than PLM, components for implementing ALM in a transponder (e.g., a mobile device) can be more compact and, because the transponder utilizes a power source to generate a magnetic field rather than just modulate a magnetic field created by a reader, an ALM transponder can have greater communication distance than a PLM transponder.

In order to perform a transaction using a NFC enabled device and a NFC reader, the NFC enabled device is brought near the NFC reader. The communication between the NFC enabled device and the NFC reader may fail if the NFC reader fails to properly demodulate the signal from the NFC enabled device. Such failures may occur if the NFC enabled device is not properly aligned with the NFC reader or if the NFC enabled device is not within a certain distance range from the NFC reader.

Such failures and other issues can be significantly reduced if there is tuning of the phase for active load modulation (ALM) in a NFC enabled device. Furthermore, there is a need to be able to calibrate the phase in production testing and handling. Therefore, it is desirable to have methods and systems to calibrate phase supported by factory trim data.

SUMMARY

The present invention provides for a method and system to compensate phase offset caused by the IC (integrated circuit) by making use of factory measurement stored as trim-data in the IC. In the final customer product, the trim-data is mapped to the actual platform environment such that the respective phase offset can be compensated.

An important point of this invention is to create and store the trim-data referenced to an artificial (virtual) platform and the respective set of artificial (virtual) parameters. When the actual calibration is applied in the customer environment, an efficient and simple scaling of the real and actual system platform parameters to the virtual trim-codes needs to be applied (e.g., by scaling).

The present invention provides for a method for determining and applying phase offset to a communications device that communicates via inductive coupling, the method comprising: (a) measuring a received signal strength indicator (RSSI) value for the communications device; (b) using a platform specific mapping table to determine an index of phase trim corresponding to the measured RSSI value for the communications device; (c) using a reference phase trim data to determine a phase offset corresponding to the index of phase trim; and (d) applying the phase offset to the communications device.

In some embodiments, the reference phase trim data maps each phase offset to each own index.

In some embodiments, the reference phase trim data is measured and stored for each individual communications device, wherein each individual communications device has its own individualized reference phase trim data.

In some embodiments, the platform specific mapping table maps each RSSI value to each own index of phase trim.

In some embodiments, the platform specific mapping table is the same for all communications device belonging to the same type of communications devices, wherein each individual communications device belonging to the same type of communications devices does not have its own individualized platform specific mapping table.

In some embodiments, the reference phase trim data is stored in a protected memory area not accessible to a user.

In some embodiments, the user is a customer.

In some embodiments, the platform specific mapping table is stored in an open memory area accessible to a user.

In some embodiments, the method further comprises: (e) determining a TX (transmitter) phase setting; (f) determining a customer phase offset; and (g) applying the phase offset, the TX (transmitter) phase setting, and the customer phase offset to the communications device.

In some embodiments, the TX (transmitter) phase setting is a phase setting used for TX (transmitter) referenced to a phase detected at RX (receiver), wherein the customer phase offset is a phase offset that is considered a part to part variation of customer boards due to matching network and antenna.

In some embodiments, the customer phase offset is a static value evaluated once in a customer production test.

The present invention also provides for a method for determining and applying phase offset to a communications device that communicates via inductive coupling, the method comprising: (a) measuring a received signal strength indicator (RSSI) value for the communications device; (b) using a platform specific mapping function to determine a variable of phase trim corresponding to the measured RSSI value for the communications device; (c) using a reference phase trim data to determine a phase offset corresponding to the variable of phase trim; and (d) applying the phase offset to the communications device.

In some embodiments; the reference phase trim data maps each phase offset to each own variable.

In some embodiments, the reference phase trim data is measured and stored for each individual communications device, wherein each individual communications device has its own individualized reference phase trim data.

In some embodiments, the platform specific mapping function maps each RSSI value to each own variable of phase trim.

In some embodiments, the platform specific mapping function is the same for all communications device belonging to the same type of communications devices, wherein each individual communications device belonging to the same type of communications devices does not have its own individualized platform specific mapping function.

In some embodiments, the reference phase trim data is stored in a protected memory area not accessible to a user.

In some embodiments; the platform specific mapping function is stored in an open memory area accessible to a user.

The present invention further provides for a method for determining and applying phase offset to a communications device that communicates via inductive coupling, the method comprising: (a) measuring a characteristic parameter for the communications device; (b) using a platform specific mapping table or function to determine an index or variable of phase trim corresponding to the measured characteristic parameter for the communications device; (c) using a reference phase trim data to determine a phase offset corresponding to the index or variable of phase trim; and (d) applying the phase offset to the communications device.

In some embodiments, the characteristic parameter is a received signal strength indicator (RSSI) value, wherein the RSSI value corresponds to a field strength of inductive coupling.

The present invention can also provide for a computer program product encoded in a non-transitory computer readable medium for determining and applying phase offset to a communications device that communicates via inductive coupling, the computer program product comprising: (a) computer code for measuring a characteristic parameter for the communications device; (b) computer code for using a platform specific mapping table or function to determine an index or variable of phase trim corresponding to the measured characteristic parameter for the communications device; (c) computer code for using a reference phase trim data to determine a phase offset corresponding to the index or variable of phase trim; and (d) computer code for applying the phase offset to the communications device.

The above summary is not intended to represent every example embodiment within the scope of the current or future Claim sets. Additional example embodiments are discussed within the Figures and Detailed Description below.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Representative devices and methods according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other embodiments are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Active load modulation (ALM) is state of the art for all mobile NFC solution in the market. In one embodiment, ALM is an actively sending of 13.56 MHz signal modulated according to standards for Type A/B/F. This grants a huge benefit in generated signal strength and allows for the use of smaller antennas by fulfilling the required standards like NFC Forum, ISO 14443, EMVCo, etc. with respect to load modulation amplitude parameter.

Figure 1:
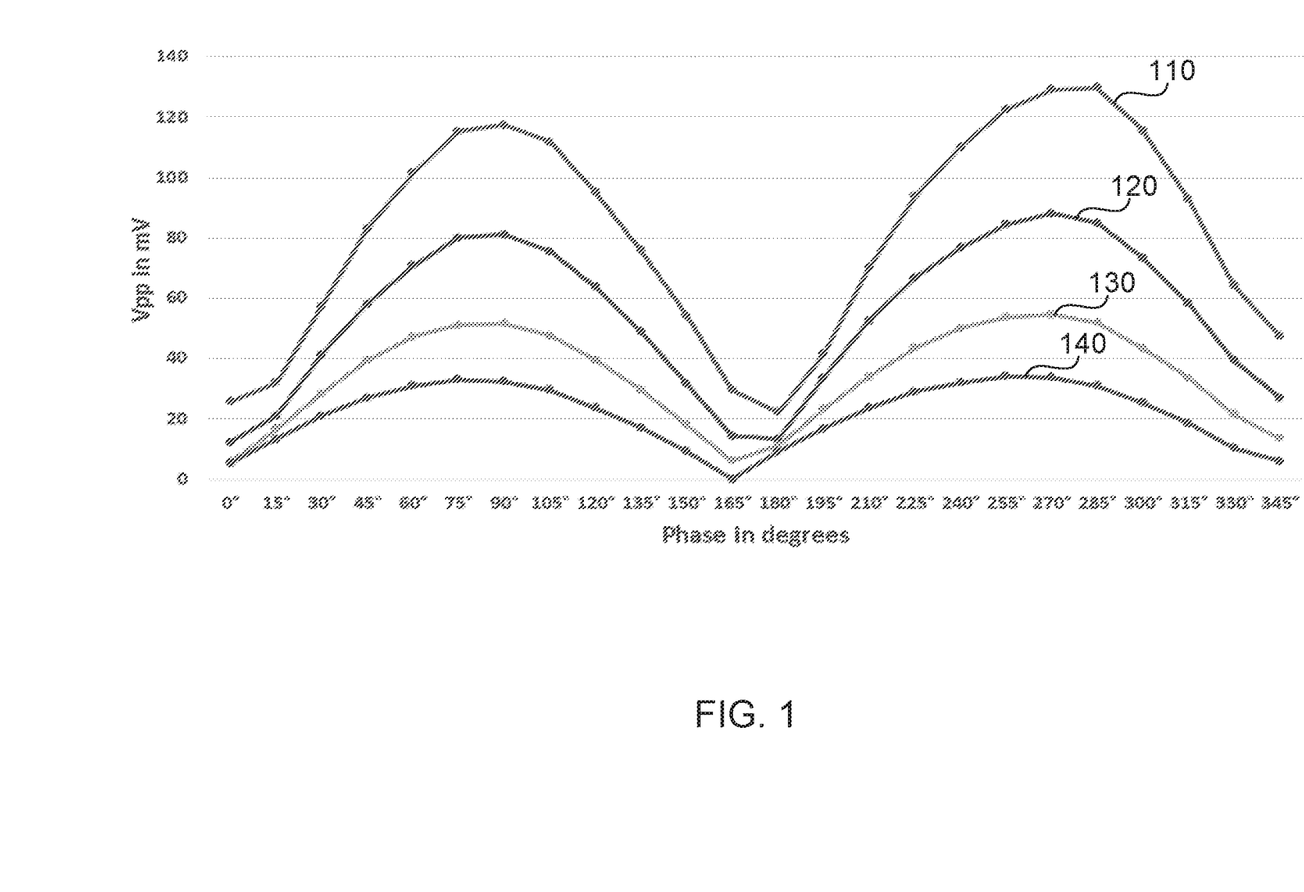
FIG. 1 shows a diagram of load modulation amplitudes versus example phase configurations of a communications device under different inductive coupling conditions, in accordance with some example embodiments.

A dedicated initial phase can be defined for the card response for all cases of ALM. The initial phase setting can be used to optimize the load modulation amplitude as shown in FIG. 1 for different coupling positions shown as "110", "120", "130", and "140". In FIG. 1, the x-axis can represent the initial phase setting in degrees (i.e., phase of ALM versus TX CW (transmitter carrier wave) signal phase). FIG. 1 shows the load modulation amplitude peaking for some phase values. Therefore, in some embodiments, the phase can be used to optimize the load modulation amplitude.

There are many reference communication counterparts in the field (and certification test) which are strongly amplitude dependent, e.g. some FeliCa readers and older payment terminals. For these readers, which are strongly amplitude dependent, it can be shown that only a small range of phase results in a passing communication. Therefore, adjusting the phase to optimize the load modulation amplitude can be a great help for use with these counterparts (e.g. some FeliCa readers and older payment terminals).

The transmitter (TX) phase (phase relation from reader field as seen on the RX and the phase of the carrier at the TX) of the NFC system depends on multiple system and/or environmental parameters/conditions (e.g., field strength, detuning/coupling condition, antenna geometries, IC (PVT) (integrated circuit—process, voltage and temperature), matching network (topology, . . . ), protocol, data-rate, retransmission, reconfiguration, timings, applications, etc.

The TX (transmitter) phase that can be used for a platform is defined by a measurement campaign with multiple reader terminals. There is a TX phase range that gives a passing communication for all readers (as, for example, defined in IOT (Interoperability Test) certification).

The main challenge for compensating the phase is to:
(1) Compensate the phase offset caused by the IC itself (which may be function of PVT, input voltage level, etc.). (Note: IC denotes integrated circuit. PVT denotes process, voltage and temperature.)
(2) Assess the input voltage level accurately such that the compensation can be done.
(3) The RSSI can be used to quantify a relative input voltage level as it is an absolute reference that depends on platform parameters such as the matching network, antenna, reference node for the RSSI, RSSI trim, etc.

Although trim in the factory (ATE) can be done already for the respective target customer platform, this might immediately cause huge diversity in test programs (such as one per customer platform) and render the logistics of ATE (automated test equipment) production testing and handling of the ICs difficult if not even impossible.

An important point of this invention is to create and store the trim-data referenced to an artificial (virtual) platform and the respective set of artificial (virtual) parameters. When the actual calibration is applied in the customer environment, an efficient and simple scaling of the real and actual system platform parameters to the virtual trim-codes needs to be applied (e.g., by scaling).

Figure 2:
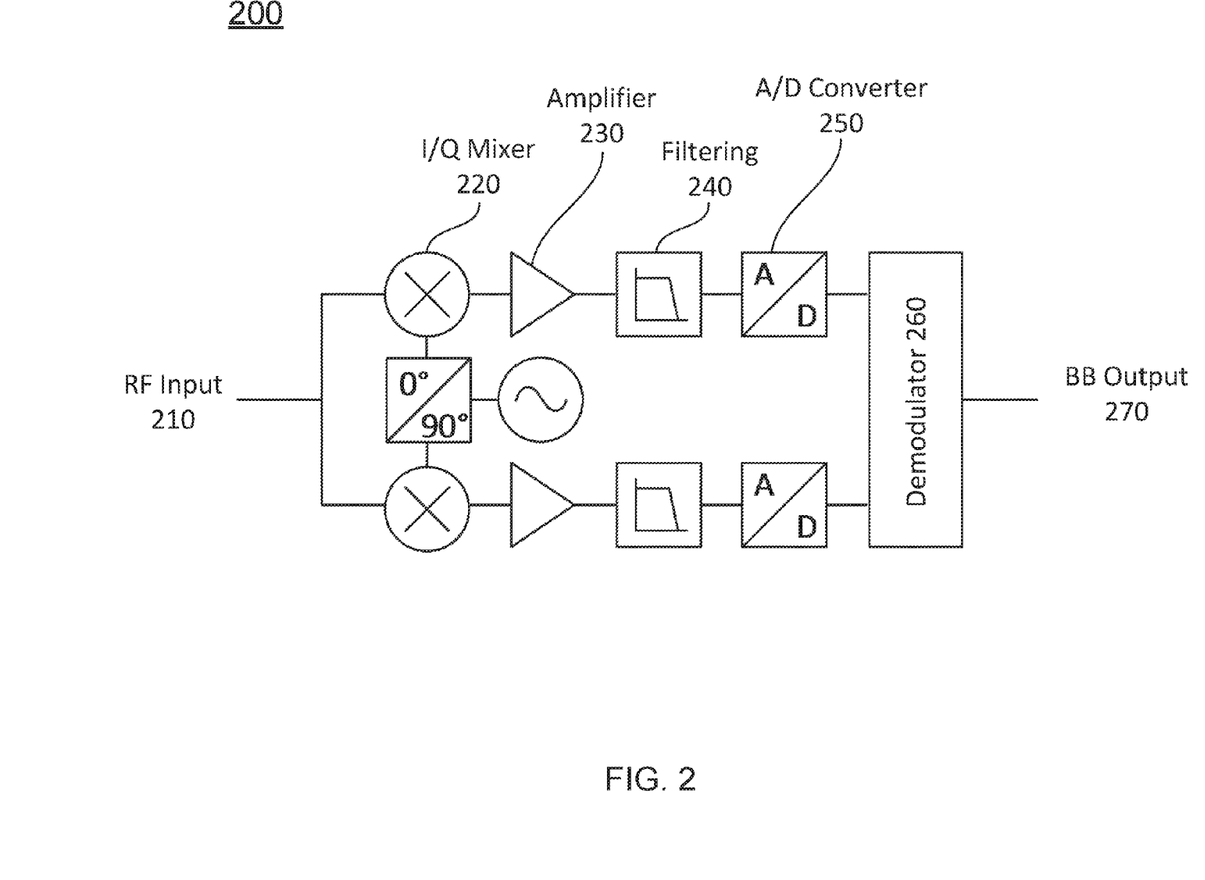
FIG. 2 shows a block diagram of a typical receiver with I/Q mixer, amplifier, filtering, A/D (analog-to-digital) converter and a signal demodulator in the baseband, in accordance with some example embodiments.

An embodiment of a typical receiver is shown in FIG. 2. The receiver 200 comprises I/Q mixer 220, amplifier 230, filtering 240, A/D converter 250, and a signal demodulator 260. The receiver receives a RF input 210 to the I/Q mixer 220 and generates a BB (baseband) output 270 from the signal demodulator 260.

Figure 3:
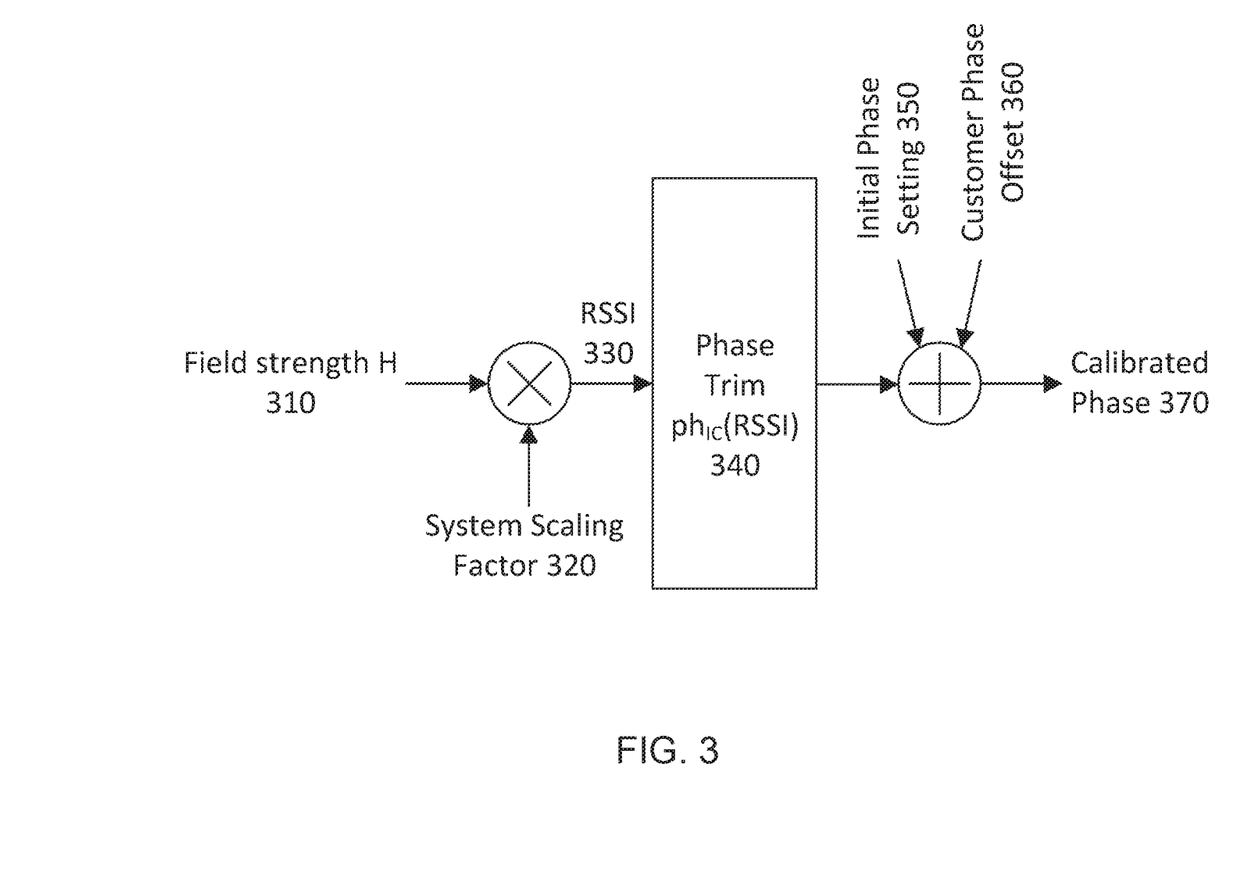
FIG. 3 shows a block diagram that provides an overview of the method for calculating a phase, in accordance with some example embodiments.

FIG. 3 gives an overview of a method for calculating a phase, in accordance with some example embodiments. There are several contributors to a calibrated phase 370, which is finally dialed into the system.

The initial phase setting 350 is the target programmed phase. This is an absolute phase value.

The customer phase offset 360 is a phase offset that considers part to part variation of customer boards due to matching network, antenna, etc. basically contributors outside the IC and hence only known to the IC by this parameter. This is a static value evaluated once in a customer production test.

RSSI 330 is the dynamically measured metric that is equivalent to the input voltage level. As the actual input voltage value depends on platform parameters and RSSI trimming, the RSSI does not give the absolute VRX voltage. Note that input voltage level and in turn RSSI 330 is dependent on the field strength H (310)

The system scaling factor 320 is a correction of the platform RSSI to the absolute VRX voltage.

An important step is the correction of the RSSI by means of the system scaling factor 320 to evaluate to the absolute VRX, which in turn is used as an index to the phase trim data (or in some embodiments, the phase trim table). Hence, the phase trim data (or in some embodiments, the phase trim table) can be kept target platform independent, while the platform dependency can be addressed by the system scaling. In FIG. 3, phase trim data is shown as Phase Trim $ph_{ic}(RSSI)$ 340.

Figure 4:
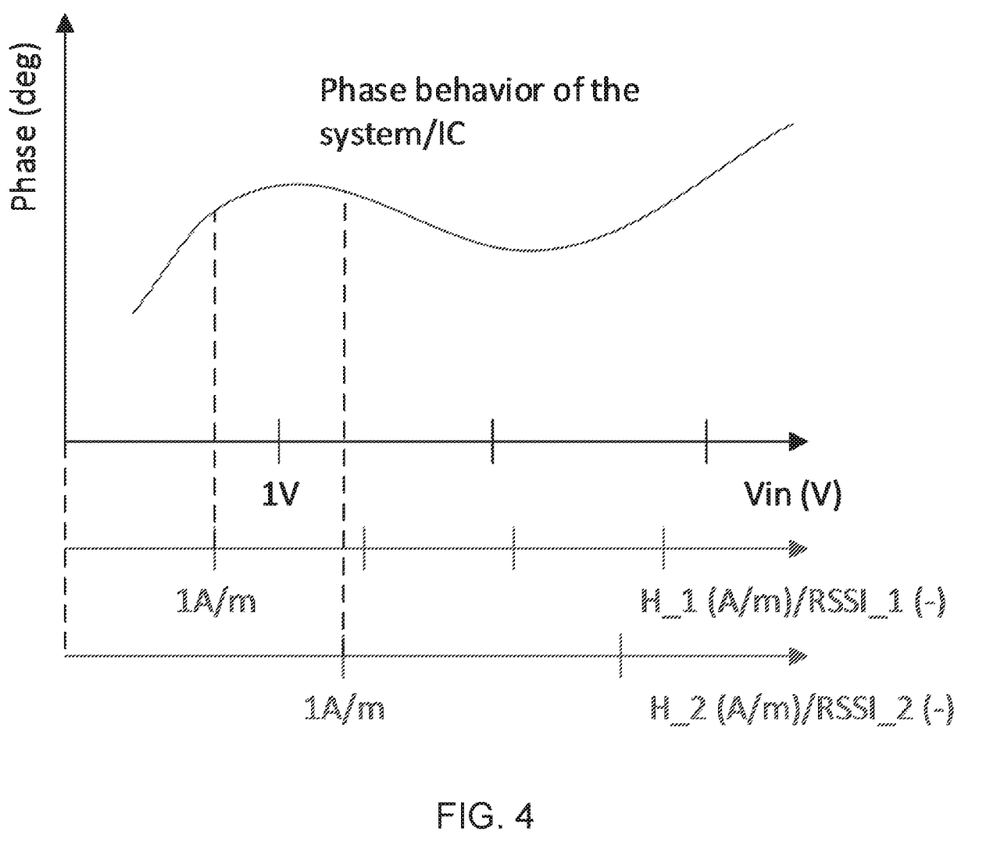
FIG. 4 shows the phase behavior of a system/IC (integrated circuit), in accordance with some example embodiments.

FIG. 4 shows the phase behavior of the system/IC (which is shown as an arbitrary shape in this example), which actually depends on the input voltage Vin. However, on the platform (e.g., platform 1, platform 2, etc.) the input signal can be quantified by field-strength or RSSI or some other characteristic parameter. In FIG. 4, for platform 1, field-strength is shown as H_1, while RSSI is shown as RSSI_1. For platform 2, field-strength is shown as H_2, while RSSI is shown as RSSI_2.

Figure 5:
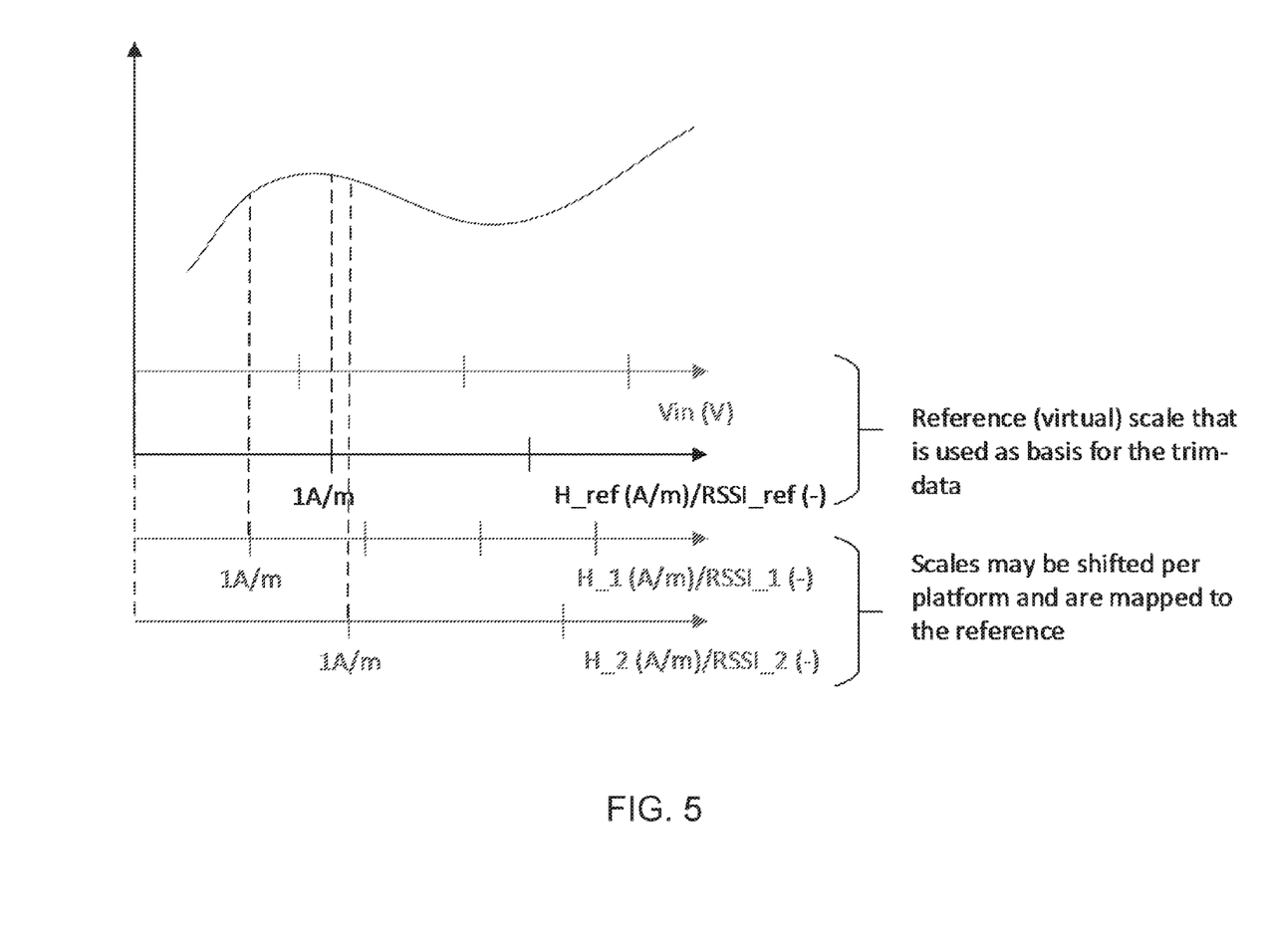
FIG. 5 shows the phase behavior of a system/IC (integrated circuit), as the field strength (H)/RSSI from the respective platforms is mapped to an invariant reference input, in accordance with some example embodiments.

FIG. 5 shows the phase behavior of a system/IC (integrated circuit), as the field strength (H)/RSSI from the respective platforms is mapped to an invariant reference input, in accordance with some example embodiments. In FIG. 5, the field-strength (H_i)/RSSI (RSSI_i)/ . . . from the respective platform i has been mapped to an invariant reference input H_ref/RSSI_ref. In particular, field-strength H_1/RSSI_1 is associated with platform 1. Field-strength H_2/RSSI_2 is associated with platform 2. Field-strength H_ref/RSSI_ref is associated with an invariant reference platform. In other word, in FIG. 5, the phase behavior of the IC/system is referenced to a virtual reference scale in terms of field-strength/RSSI, which in turn is used as basis, which the platform metrics (H, RSSI) is mapped to.

TABLE 1A

| Reference | | Platform 1 | | Platform 2 | |
|---|---|---|---|---|---|
| H_ref (A/m) | Phase Offset (deg) | H_ref (A/m) | Phase Offset (deg) | H_ref (A/m) | Phase Offset (deg) |
| 1 | phi_1 | 1.1 | phi_1 | 0.75 | phi_1 |
| 2 | phi_2 | 2.2 | phi_2 | 1.5 | phi_2 |
| 3 | . . . | 3.3 | . . . | 2.25 | . . . |
| 4 | | 4.4 | | 3 | |
| 5 | | 5.5 | | 3.75 | |
| 6 | | 6.6 | | 4.5 | |
| 7 | | 7.7 | | 5.25 | |
| 8 | | 8.8 | | 6 | |
| 9 | | 9.9 | | 6.75 | |
| 10 | | 11 | | 7.5 | |

TABLE 1B

| Reference | | Platform 1 | | Platform 2 | |
|---|---|---|---|---|---|
| RSSI (−) | Phase Offset (deg) | RSSI (−) | Phase Offset (deg) | RSSI (−) | Phase Offset (deg) |
| 100 | phi_1 | 110 | phi_1 | 75 | phi_1 |
| 200 | phi_2 | 120 | phi_2 | 150 | phi_2 |
| 300 | . . . | 130 | . . . | 225 | . . . |
| 400 | | 140 | | 300 | |
| 500 | | 150 | | 375 | |
| 600 | | 160 | | 450 | |
| 700 | | 170 | | 525 | |
| 800 | | 180 | | 600 | |
| 900 | | 190 | | 675 | |
| 1000 | | 200 | | 750 | |

In Table 1A and 1B, the phase offsets phi_1, phi_2, . . . are referred to different field-strength/RSSI depending on the actual platform. Table 1A and 1B show the mapping between phase to be compensated (phi_i) and the respective parameter to be selected (i.e., field strength H for Table 1A and RSSI for Table 1B). Note that the values are examples only for illustrative purposes.

The important point is that the input to the mapping (e.g., field-strength, RSSI) is different from platform to platform and to the reference. This variation can be overcome by adjusting the input parameters according to the reference. This is inflexible and undesirable.

TABLE 2

| | Reference | Platform 1 | | Platform 2 | |
|---|---|---|---|---|---|
| ID | Phase Offset (deg) | H_ref (A/m) | Index of phase trim | H-ref (A/m) | Index of phase trim |
| 0 | phi_1 | 1 | 0 | 1 | 0 |
| 1 | phi_2 | 2 | 1 | 2 | 2 |
| 2 | ... | 3 | 2 | 3 | 3 |
| 3 | | 4 | 3 | 4 | 4 |
| 4 | | 5 | 4 | 5 | 6 |
| 5 | | 6 | 4 | 6 | 7 |
| 6 | | 7 | 5 | 7 | 8 |
| 7 | | 8 | 6 | 8 | ... |
| 8 | | 9 | 7 | 9 | |
| 9 | | 10 | 8 | 10 | |

The approach is to use a mapping table (or function) as shown in Table 2. This function allows for the use of the same scale for the input (in this example in terms of field-strength, but in another embodiment it could be RSSI as well) or an arbitrary scale. The important part of the mapping table is that the scale per platform maps (tabular or function) to the index of the actual trim-table (the reference table).

Consequently, the mapping that needs to be defined per platform no longer needs to contain any phase data, since that has been moved into the reference table. The reference table, in turn, can be considered as a trim-data table that is filled with data during a factory test (of the IC) and is fully separated and independent of the platform specifics.

TABLE 3

| | Reference |
|---|---|
| ID | Phase Offset (deg) |
| 0 | phi_1 |
| 1 | phi_2 |
| 2 | ... |
| 3 | |
| 4 | |
| 5 | |
| 6 | |
| 7 | |
| 8 | |
| 9 | |

The information is generated in the following sequence.

The first step is generation of the compensation table, which is referred to a reference system as shown in Table 3. This table is generated on a test system by the ATE (automated test equipment). In some embodiments, this table may be stored in a "trim-area", a protected memory in a non-volatile memory that is persistent and will not be changed later on.

TABLE 4A

| | Platform 1 | |
|---|---|---|
| ID | H_1 (A/m) | Index of phase trim |
| 0 | 1 | 0 |
| 1 | 2 | 1 |
| 2 | 3 | 2 |
| 3 | 4 | 3 |
| 4 | 5 | 4 |
| 5 | 6 | 4 |

TABLE 4A-continued

| | Platform 1 | |
|---|---|---|
| ID | H_1 (A/m) | Index of phase trim |
| 6 | 7 | 5 |
| 7 | 8 | 6 |
| 8 | 9 | 7 |
| 9 | 10 | 8 |

TABLE 4B

| | Platform 2 | |
|---|---|---|
| ID | H_2 (A/m) | Index of phase trim |
| 0 | 1 | 0 |
| 1 | 2 | 2 |
| 2 | 3 | 3 |
| 3 | 4 | 4 |
| 4 | 5 | 6 |
| 5 | 6 | 7 |
| 6 | 7 | 8 |
| 7 | 8 | ... |
| 8 | 9 | |
| 9 | 10 | |

TABLE 5A

| | Platform 1 | |
|---|---|---|
| ID | RSSI_1 (−) | Index of phase trim |
| 0 | 110 | 0 |
| 1 | 120 | 1 |
| 2 | 130 | 2 |
| 3 | 140 | 3 |
| 4 | 150 | 4 |
| 5 | 160 | 4 |
| 6 | 170 | 5 |
| 7 | 180 | 6 |
| 8 | 190 | 7 |
| 9 | 200 | 8 |

TABLE 5B

| | Platform 2 | |
|---|---|---|
| ID | RSSI_2 (−) | Index of phase trim |
| 0 | 75 | 0 |
| 1 | 150 | 2 |
| 2 | 225 | 3 |
| 3 | 300 | 4 |
| 4 | 375 | 6 |
| 5 | 450 | 7 |
| 6 | 525 | 8 |
| 7 | 600 | ... |
| 8 | 675 | |
| 9 | 750 | |

In the second step, platform specific data can go into the platform specific tables as shown in Table 4A or Table 4B, which may be changed by customers or at least will be updated specifically for customer's needs. In some embodiments, the relevant data is stored in an "open" memory area. "Open" means it is accessible for the customer.

In some embodiments, the table may be overwritten by the customer, and it will be specific to a platform.

In some embodiments, the generation of the table (storing the correct indices) may be done with help of spreadsheets.

Table 4A and 4B are basically equivalent to Table 5A and 5B. The only difference is Table 4A and 4B refer to field-strength H, while Table 5A and 5B refer to RSSI. In some embodiments, Table 4A and 4B are the tables that contains the principal data. In some embodiments, Table 5A and 5B are the important tables that are applied, used, and stored. This can be due to RSSI being the characteristic parameter being measured and used to determine the phase offset.

Figure 6:
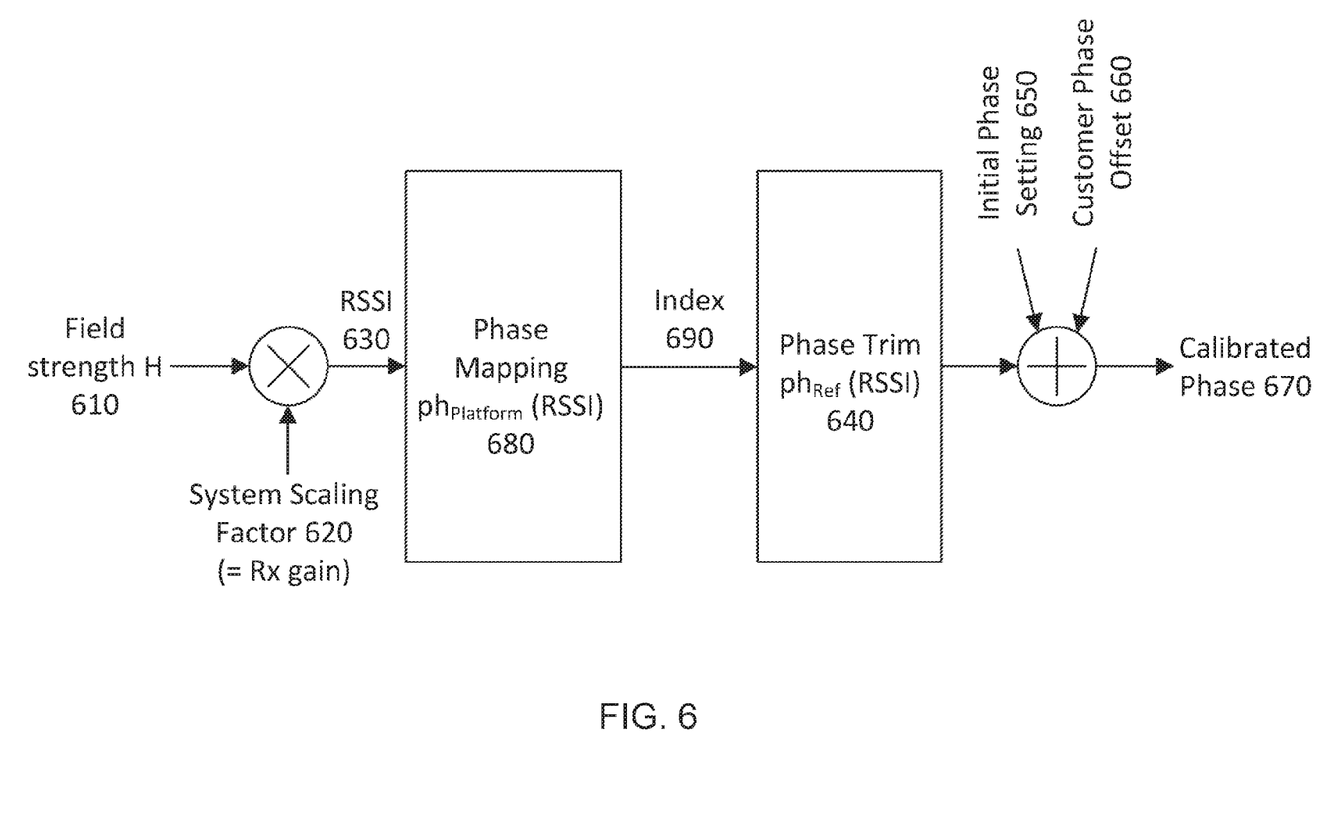
FIG. 6 shows a block diagram that provides an overview of the method for calculating a phase that uses a reference phase trim data to determine a phase offset, in accordance with some example embodiments.

In some embodiments, Table 4A and 4B can be known as platform specific mapping tables (based on field strength H). In some embodiments, Table 5A and 5B can be known as platform specific mapping tables (based on RSSI). In some embodiments, the information contained in Table 4A, 4B, 5A, and 5B can be presented as platform specific mapping functions. For platform specific mapping tables (which correspond to Phase Mapping $ph_{Platform}(RSSI)$ 680 in FIG. 6), FIG. 6 shows the output to be index 690. Index 690 is then used with Table 3 (which corresponds to Phase Trim $ph_{Ref}(RSSI)$ 640 in FIG. 6) to obtain the according "trimmed phase". Therefore, a platform specific mapping tables is associated with an index. For a platform specific mapping tables, the corresponding association would be more generally a variable.

FIG. 6 shows a block diagram that provides an overview of the method for calculating a phase that uses a reference phase trim data to determine a phase offset, in accordance with some example embodiments. FIG. 6 shows how the various values can be combined for calculating a phase, in accordance with some example embodiments.

Here is an embodiment of a procedure for applying the method and system shown in FIG. 6.

In the first step, measure (or read) RSSI 630.

RSSI 630 is the dynamically measured metric that is equivalent to the input voltage level. As the actual input voltage value depends on platform parameters and RSSI trimming, the RSSI does not give the absolute VRX voltage. Note that input voltage level and in turn RSSI 630 is dependent on the field strength H (610), the system scaling factor 620 is a correction of the platform RSSI to the absolute VRX voltage.

In the second step, go into Table 5 (i.e., 5A or 5B, depending on the platform) and get the index 690. In FIG. 6, Table 5 is represented by Phase Mapping $ph_{platform}(RSSI)$ 680. In some embodiments, Table 5 can be called a platform specific mapping table or function.

In the third step, go into Table 3 with the index and get the according "trimmed phase", which is the IC phase offset that depends on the input voltage level (which is equivalent to RSSI). In FIG. 6, Table 3 is represented by Phase Trim $ph_{Ref}(RSSI)$ 640. In some embodiments, Table 3 can be called a reference phase trim data or a reference phase trim table.

In the fourth step, the "trimmed phase" will be applied to the overall phase as per FIG. 6. In particular, the "trimmed phase" will be combined with initial phase setting 650 and customer phase offset 660 to contribute to a calibrated phase 670, which is finally dialed into the system.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for determining and applying phase offset to a Near Field Communication (NFC) communications device that communicates via inductive coupling, the method comprising:
    measuring a received signal strength indicator (RSSI) value for the NFC communications device that communicates via inductive coupling, wherein the RSSI value corresponds to a field strength of inductive coupling;
    using a platform specific mapping table to determine an index of phase trim corresponding to the measured RSSI value for the NFC communications device that communicates via inductive coupling;
    using a reference phase trim data to determine a phase offset corresponding to the index of phase trim; and
    applying the phase offset to the NFC communications device that communicates via inductive coupling;
    wherein the platform specific mapping table maps each RSSI value to each own index of phase trim;
    wherein the platform specific mapping table is the same for all NFC communications device belonging to the same type of NFC communications devices, wherein each individual NFC communications device belonging to the same type of NFC communications devices does not have its own individualized platform specific mapping table.

2. The method of claim 1, wherein the reference phase trim data maps each phase offset to each own index.

3. The method of claim 2, wherein the reference phase trim data is measured and stored for each individual NFC communications device, wherein each individual NFC communications device has its own individualized reference phase trim data.

4. The method of claim 1, wherein the reference phase trim data is stored in a protected memory area not accessible to a user.

5. The method of claim 4, wherein the user is a customer.

6. The method of claim 1, wherein the platform specific mapping table is stored in an open memory area accessible to a user.

7. The method of claim 1, further comprising:
    determining a TX (transmitter) phase setting;
    determining a customer phase offset; and applying the phase offset, the TX (transmitter) phase setting, and the customer phase offset to the NFC communications device.

8. The method of claim 7,
wherein the TX (transmitter) phase setting is a phase setting used for TX (transmitter) referenced to a phase detected at RX (receiver),
wherein the customer phase offset is a phase offset that is considered a part to part variation of customer boards due to matching network and antenna.

9. The method of claim 8, wherein the customer phase offset is a static value evaluated once in a customer production test.

10. A method for determining and applying phase offset to a Near Field Communication (NFC) communications device that communicates via inductive coupling, the method comprising:
measuring a received signal strength indicator (RSSI) value for the NFC communications device that communicates via inductive coupling, wherein the RSSI value corresponds to a field strength of inductive coupling;
using a platform specific mapping function to determine a variable of phase trim corresponding to the measured RSSI value for the NFC communications device that communicates via inductive coupling;
using a reference phase trim data to determine a phase offset corresponding to the variable of phase trim; and
applying the phase offset to the NFC communications device that communicates via inductive coupling;
wherein the platform specific mapping function maps each RSSI value to each own variable of phase trim;
wherein the platform specific mapping function is the same for all NFC communications device belonging to the same type of NFC communications devices, wherein each individual NFC communications device belonging to the same type of NFC communications devices does not have its own individualized platform specific mapping function.

11. The method of claim 10, wherein the reference phase trim data maps each phase offset to each own variable.

12. The method of claim 11, wherein the reference phase trim data is measured and stored for each individual NFC communications device, wherein each individual NFC communications device has its own individualized reference phase trim data.

13. The method of claim 10, wherein the reference phase trim data is stored in a protected memory area not accessible to a user.

14. The method of claim 10, wherein the platform specific mapping function is stored in an open memory area accessible to a user.

15. A method for determining and applying phase offset to a Near Field Communication (NFC) communications device that communicates via inductive coupling, the method comprising:
measuring a received signal strength indicator (RSSI) value for the NFC communications device that communicates via inductive coupling, wherein the RSSI value corresponds to a field strength of inductive coupling;
using a platform specific mapping table to determine an index of phase trim corresponding to the measured RSSI value for the NFC communications device that communicates via inductive coupling;
using a reference phase trim data to determine a phase offset corresponding to the index of phase trim; and
applying the phase offset to the NFC communications device that communicates via inductive coupling; and
further comprising:
determining a TX (transmitter) phase setting;
determining a customer phase offset; and
applying the phase offset, the TX (transmitter) phase setting, and the customer phase offset to the NFC communications device.

16. The method of claim 15,
wherein the TX (transmitter) phase setting is a phase setting used for TX (transmitter) referenced to a phase detected at RX (receiver),
wherein the customer phase offset is a phase offset that is considered a part to part variation of customer boards due to matching network and antenna.

17. The method of claim 16, wherein the customer phase offset is a static value evaluated once in a customer production test.

* * * * *